US012507843B1

(12) United States Patent
Maurer

(10) Patent No.: US 12,507,843 B1
(45) Date of Patent: Dec. 30, 2025

(54) PORTABLE TOILET ASSEMBLY

(71) Applicant: Gary K. Maurer, Midlothian, VA (US)

(72) Inventor: Gary K. Maurer, Midlothian, VA (US)

( * ) Notice: Subject to any disclaimer, the term of this patent is extended or adjusted under 35 U.S.C. 154(b) by 82 days.

(21) Appl. No.: 18/412,824

(22) Filed: Jan. 15, 2024

Related U.S. Application Data

(60) Provisional application No. 63/439,644, filed on Jan. 18, 2023.

(51) Int. Cl.
*A47K 13/26* (2006.01)
*B60R 15/04* (2006.01)

(52) U.S. Cl.
CPC .............. *A47K 13/26* (2013.01); *B60R 15/04* (2013.01)

(58) Field of Classification Search
CPC ................................ A47K 13/26; B60R 15/04
USPC ........................................ 4/237; 234/98, 217
See application file for complete search history.

(56) References Cited

U.S. PATENT DOCUMENTS 1,218,922 A * 3/1917 Bass ...................... A47K 13/00 4/237
2,557,713 A * 6/1951 Williams ............... A47K 13/10 4/237
2,804,630 A * 9/1957 Gould .................... A47K 13/06 16/365
3,142,068 A * 7/1964 Leventhal ............... D06F 41/00 68/245
3,378,855 A * 4/1968 Springer ................... E03D 3/10 4/300
3,495,277 A * 2/1970 Herskovich ............ A47K 11/04 4/237
3,594,831 A * 7/1971 Brewer ................ A47K 13/005 4/237
4,153,957 A * 5/1979 Lifton .................... A47K 13/06 4/239
4,168,552 A * 9/1979 Austin ................. A61G 7/1007 4/667
4,733,419 A * 3/1988 Nee ........................ A47K 13/24 4/234
5,309,583 A * 5/1994 White .................. A61G 7/1007 297/DIG. 10
5,787,514 A * 8/1998 Erli ........................ A47K 13/06 4/239
6,009,569 A * 1/2000 Ferrara ................ A47K 13/105 4/246.1
6,052,838 A * 4/2000 Thom .................. A47K 13/005 4/235
6,339,851 B1 * 1/2002 Bergkvist ............... A47K 13/26 4/239
6,665,886 B1 * 12/2003 Chu ........................ A47K 13/26 4/237
6,775,858 B1 * 8/2004 Miller .................. A61G 5/1059 297/DIG. 10
6,904,622 B1 * 6/2005 Gabriel ................ A47K 13/005 4/237

(Continued)

FOREIGN PATENT DOCUMENTS

EP 3811836 A1 * 4/2021 ............. A47K 13/12
WO WO-0042262 A1 * 7/2000 ............... E03D 9/05

*Primary Examiner* — Lori L Baker
(74) *Attorney, Agent, or Firm* — Hooker & Habib, P.C.

(57) ABSTRACT

A portable toilet assembly includes a toilet seat support and a frame. The toilet seat support defines a slot that receives a cross-member of the frame to removably mount the toilet seat support to the frame whereby the toilet seat support can be removed from the frame when not in use.

10 Claims, 9 Drawing Sheets

(56) References Cited

U.S. PATENT DOCUMENTS 6,959,458 B1 * 11/2005 Tsai ........................ A47K 13/24 D23/311
7,216,374 B2 * 5/2007 Hassan ................ A47K 13/302 4/234
7,774,868 B2 * 8/2010 Landsberger ........ A47K 13/005 4/240
7,827,626 B2 * 11/2010 Zhou ...................... A47K 13/26 4/240
7,958,576 B1 * 6/2011 Johnson .................. E03D 1/145 4/324
8,024,821 B2 * 9/2011 Chen ...................... A47K 13/26 4/240
8,069,501 B2 * 12/2011 Casson ................ A47K 13/307 4/237
8,091,154 B2 * 1/2012 Allen ..................... A47K 13/12 4/234
8,209,789 B2 * 7/2012 Greenspon ............. A47K 13/26 4/234
9,907,443 B1 * 3/2018 Vinal ..................... A47K 13/26
11,678,778 B1 * 6/2023 Jin ....................... A47K 17/028 4/237
11,766,155 B2 * 9/2023 Terry ..................... A47K 13/26 4/237
11,779,170 B2 * 10/2023 Wallberg ................ A47K 13/06 4/239
2001/0034901 A1 * 11/2001 McEntee, Sr. ....... A47K 13/105 4/246.1
2001/0037520 A1 * 11/2001 Farzanehfar ........... A47K 13/02 4/237
2004/0199986 A1 * 10/2004 Bernsley ................ A47K 13/06 4/237
2005/0235404 A1 * 10/2005 Jiang .................... A47K 13/005 4/237
2008/0209618 A1 * 9/2008 Brill ....................... A47K 13/24 4/237
2009/0320194 A1 * 12/2009 Lovatt .................... A47K 13/06 4/237
2010/0050328 A1 * 3/2010 Hennington ......... A47K 13/005 4/237
2010/0146688 A1 * 6/2010 Fielding, Jr. ........... A47K 13/26 4/237
2011/0030134 A1 * 2/2011 Dubiel ................... A47K 11/06 4/237
2011/0088155 A1 * 4/2011 Edwards ................ A47K 13/28 4/237
2012/0304370 A1 * 12/2012 Gianfagna ........... A61G 7/1007 4/237
2013/0219605 A1 * 8/2013 Grover .................... E03D 11/08 4/300.3
2014/0230142 A1 * 8/2014 Baker ...................... A61G 5/14 4/667
2014/0259337 A1 * 9/2014 Melvin, Jr ........... A47K 13/105 4/237
2015/0313426 A1 * 11/2015 Cheng .................... A47K 13/26 4/237
2015/0351594 A1 * 12/2015 Veros .................... F21V 21/108 362/101
2015/0359392 A1 * 12/2015 Richmond ............. A47K 13/02 4/237

* cited by examiner

PORTABLE TOILET ASSEMBLY

RELATED APPLICATION

This application is a non-provisional application of and claims priority to currently U.S. Provisional Patent Application Ser. No. 63/439,644 titled "Portable Toilet Assembly" filed Jan. 18, 2023, which priority provisional patent application is incorporated by reference as if fully disclosed herein.

FIELD OF THE DISCLOSURE

The disclosure relates generally to toilets, and more specifically, toilets having a removable toilet seat support.

BACKGROUND OF THE DISCLOSURE

Smaller, more compact travel trailers or recreation vehicles used as housing for overnight stays and the like have limited interior space. It is desirable to provide a toilet that, when not in use, takes up less interior space than when in use.

SUMMARY OF THE DISCLOSURE

Disclosed is a portable toilet assembly suitable for compact travel trailers or recreational vehicles that, when not in use, takes up less interior space than when in use.

A portable toilet assembly in accordance with this disclosure includes a frame and a toilet seat support removably attachable to the frame. The frame is fixedly attached to a wall or wall studs of the trailer or vehicle. The toilet seat support is preferably configured to mount a conventional toilet seat.

When the toilet seat support is attached to the frame, the frame and toilet seat support form a toilet in which the frame supports the weight of the toilet seat support and a user on the toilet seat support. The toilet seat support is supported as a cantilever beam on the frame, the toilet seat support extending away from an end portion of the toilet seat support supported on the frame.

When the toilet seat support is removed from the frame, there is additional usable interior space in the trailer or vehicle that can be temporarily used until use of the toilet is again required.

To use the disclosed portable toilet assembly, a bucket, bag, or other container may be temporarily placed or attached underneath the toilet seat support to receive waste.

Other objects and features of the disclosure will become apparent as the description proceeds, especially when taken in conjunction with the accompanying drawing sheets illustrating one or more illustrative embodiments.

DETAILED DESCRIPTION

Figure 1:
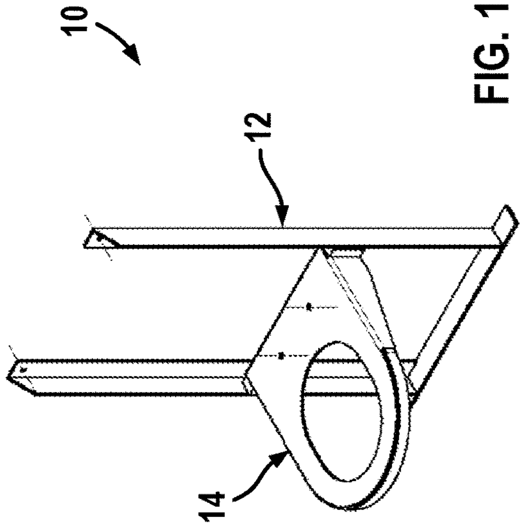
FIG. 1 is a perspective view of an assembled toilet assembly in accordance with this disclosure.
Figure 2:
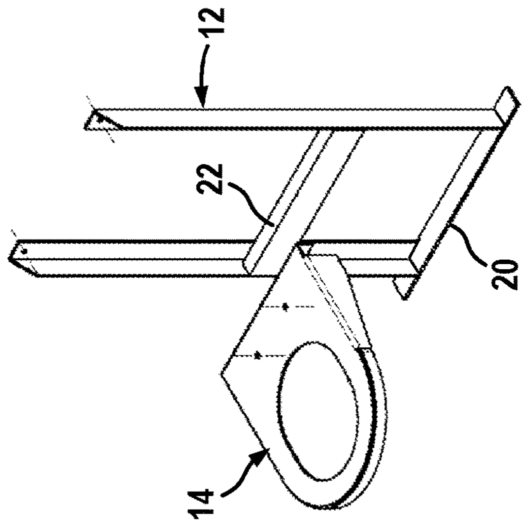
FIG. 2 is a perspective view of the toilet assembly similar to FIG. 1 but with the toilet seat support separated from the frame.

FIGS. 1 and 2 are perspective views illustrating a portable toilet assembly 10 in accordance with this disclosure. The portable toilet assembly includes a frame 12 and a toilet seat support 14. The illustrated frame and toilet seat support are made of aluminum, but other suitable materials can be used.

FIG. 1 illustrates the toilet seat support attached to the frame to form a toilet. FIG. 2 illustrates the toilet seat support removed from and spaced away from the frame 12.

Figure 4:
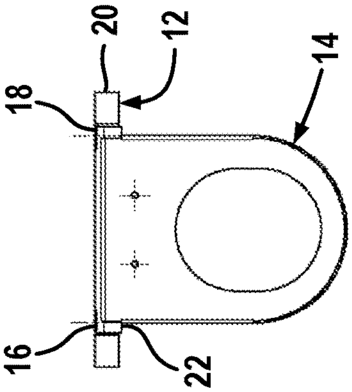
FIG. 4 is a top view of the toilet assembly.
Figure 3:
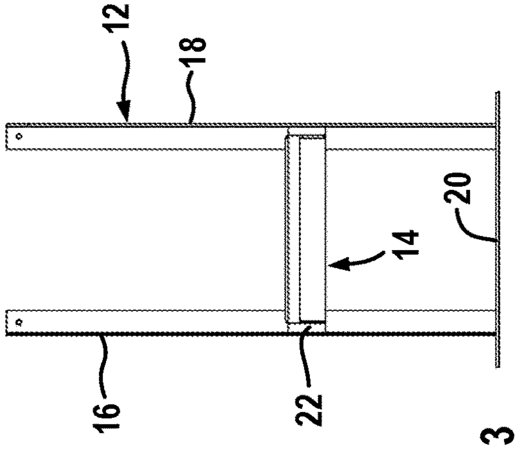
FIG. 3 is a front view of the toilet assembly.

FIGS. 3 and 4 are front and top views respectively of the toilet seat assembly as shown in FIG. 1. The frame 12 is a rigid assembly formed of a pair of vertical uprights 16, 18 that extend from a flat foot plate 20. The uprights 16, 18 are each an elongate member extending along a respective longitudinal axis that defines a vertical direction of the frame. The foot plate is an elongate member extending along a longitudinal axis that defines a horizontal direction of the frame. The foot plate is disposed against the floor of the trailer or vehicle and the uprights are disposed against a wall or studs of the trailer or vehicle. A horizontal cross-member 22 spaced apart from the foot plate and the lower ends of the uprights has opposite ends attached to the uprights 16, 18. The cross-member 22 is an elongate member extending along a longitudinal axis that is vertically aligned with and parallel with the longitudinal axis of the foot plate.

As shown in FIGS. 1, 3, and 4, the toilet seat support 14 is mounted to the frame cross-member 22. The frame cross-member 22 removably mounts the toilet seat support to the frame. When forming a toilet, the toilet seat support 14 extends from the frame cross-member 22 away from the frame 12. The portion of the toilet seat support 14 that supports a user during use is spaced sufficiently away from the frame for comfortable use of the toilet by the user. The frame cross-member is spaced from the foot plate a distance that spaces the attached toilet seat support a comfortable distance from the floor for use whereby use of the toilet 10 is similar to that of a conventional porcelain toilet.

Figure 5:
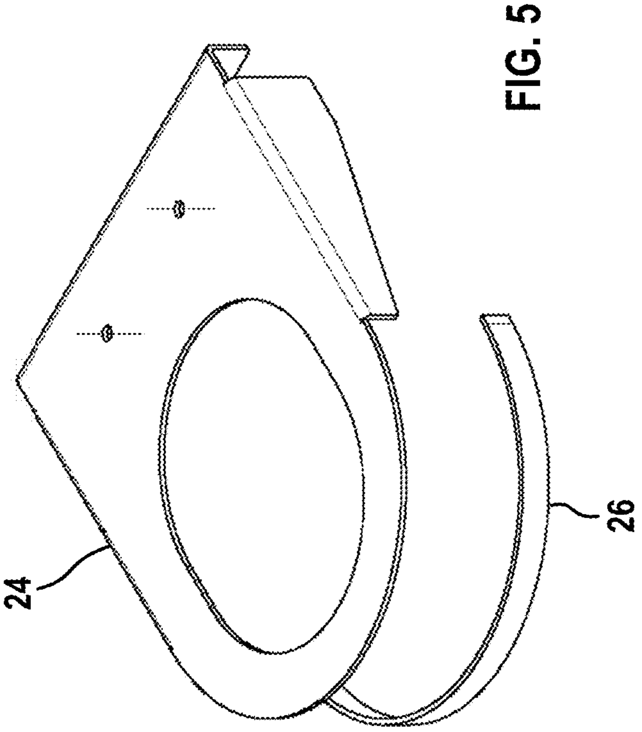
FIGS. 5 and 6 are perspective views of the construction of the toilet seat support.
Figure 6:
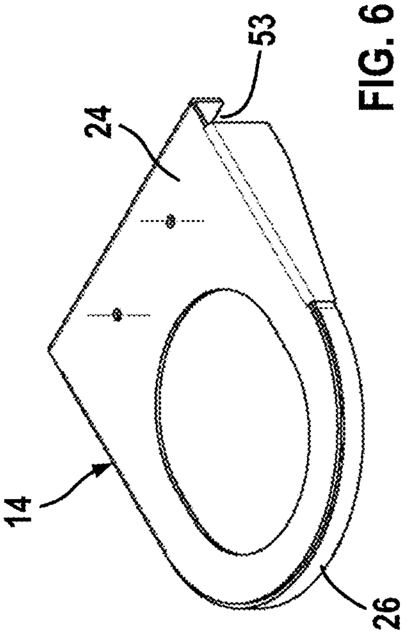

FIGS. 5 and 6 are perspective views of the construction of the toilet seat support 14. In the illustrated embodiment the toilet seat support is formed from a mount plate 24 and a semi-circular band 26 welded to the mount plate 24.

Figure 7:
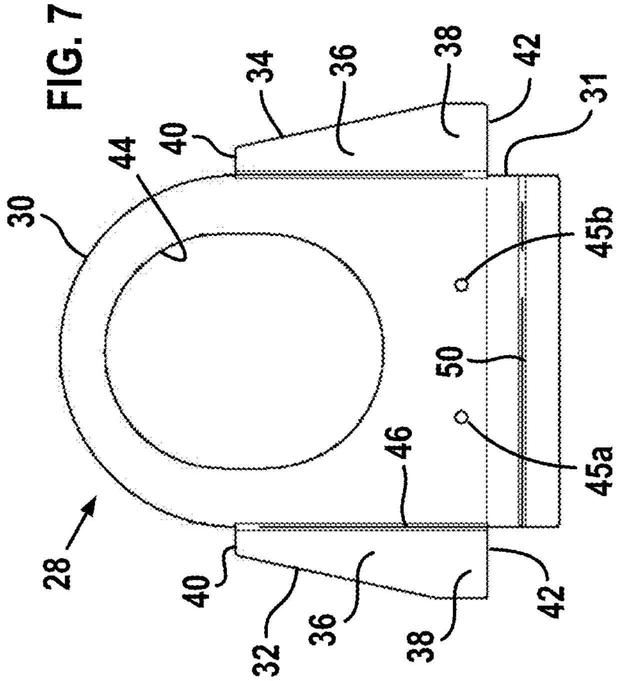
FIG. 7 is a top plan view of a plate that forms the mount plate of the toilet seat support.

The mount plate 24 is manufactured from a flat plate 28 shown in top plan view in FIG. 7. The plate is formed with a semi-circular portion 30 at the forward end of the plate and a rectangular portion 31 extending from the semi-circular portion to an opposite back end of the plate.

A pair of side panels 32, 34 extend outwardly from opposite sides of the rectangular plate portion 31. Each side panel includes a trapezoidal portion 36 and a rectangular portion 38 extending from the trapezoidal portion towards the back end of the plate. Each side panel extends from a respective forward side 40 that extends perpendicularly away from a side of the rectangular portion and a back side 42 that also extends perpendicularly away from a side of the rectangular portion. The back sides 42 are spaced inwardly from the back end of the plate.

A hole 44 is cut out of the plate to form the toilet opening that receives waste. A pair of smaller seat post holes 45*a*, 45*b* are disposed and configured to mount a conventional toilet seat (not shown) having a pivotable seat and lid onto the toilet seat support 14.

Current US industry standards provide that toilets have seat post holes on 5½ inch centers. Elongate toilet bowls are 18½ inches from seat posts to front of rim. Round toilet bowls are 16½ inches from seat posts to front of rim. The seat post hole spacing 45*a*, 45*b* in embodiments can be spaced to comply with US industry standards or with industry standards of other countries. The mount plate in embodiments can be configured to enable use of an elongate toilet bowl seat or of a round toilet bowl seat.

To form the mount plate 24, the side panels 32, 34 are folded downwardly 90 degrees along respective fold lines 46, 48 that extend along the sides of the rectangular portion 31. The rectangular portion is also folded downwardly 90 degrees along a fold line 50 spaced inwardly from the back end of the plate to form a back panel 52 (see FIG. 10) that extends parallel with the back end of the plate. The back panel 52 is spaced away from the side panels 32, 34, defining a gap 54 therebetween. The back panel 52, the side panels 32, 34, and the rectangular portion 31 of the mount plate cooperate to define a slot 53 that extends axially along the back panel 52 which faces and bounds a side of the slot wherein the slot can closely receive the frame cross-member 22 through the gap 54.

Figure 8:
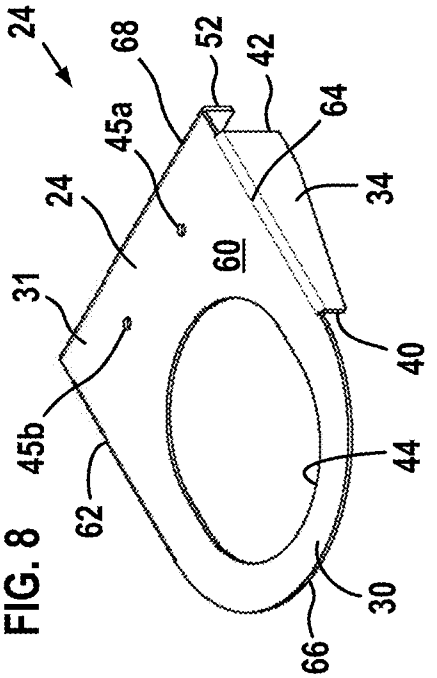
FIGS. 8, 9, and 10 are perspective, front, and side views respectively of the mount plate.
Figure 10:
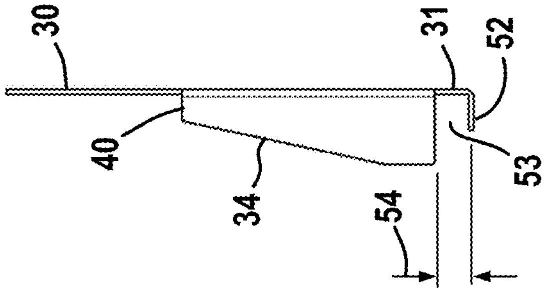
Figure 9:
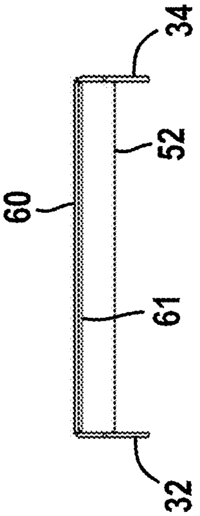

FIGS. 8, 9, and 10 are perspective, front, and side views respectively of the mount plate 24 formed after folding the flat plate 28 to form a one-piece homogeneous member. The mount plate has a flat upper surface 60 and opposite flat lower surface 61 that extends between opposite lateral left side 62 and right side 64, and between opposite front side 66 and back side 68. The side panels 32, 34 are disposed extending along respective lateral sides 62, 64 of the mount plate. The back panel 52 extends along the back side 68 of the mount plate. The forward sides 40 of the side panels 34, 36 face forward. The back sides 42 of the side panels face rearwardly and cooperatively define the gap 54 with the back panel 52.

The slot 53 and the gap 54 each extends both along the rectangular portion 31 and the back panel 52 perpendicular to the plane of the drawing sheet as shown in FIG. 10. The gap 54 is sized to closely receive the cross-member 22 into the slot 53 when the toilet seat support 14 is mounted on the frame 12.

Figure 11:
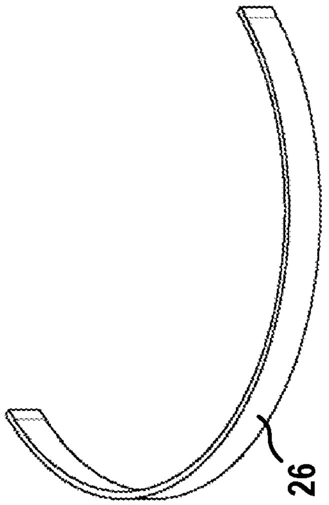
FIGS. 11, 12, and 13 are perspective, top, and developed views of the semi-circular band that forms part of the toilet seat support.
Figure 12:
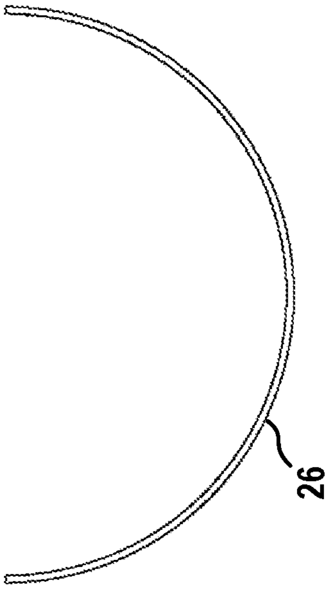
Figure 13:
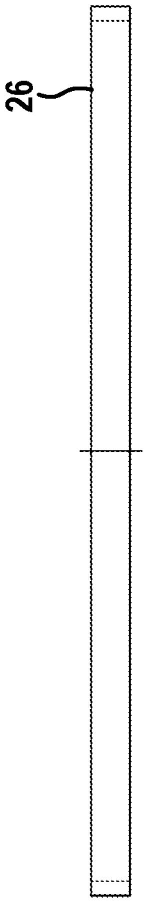

FIGS. 11, 12, and 13 are perspective, top, and developed views of the semi-circular band 26. The ends of the band abut the front ends 40 of the side panels. The band is welded to the bottom side of the mount plate 28 as shown in FIG. 6.

Figure 14:
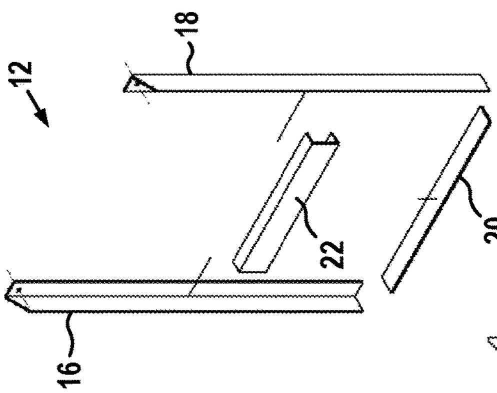
FIG. 14 is an exploded view of the frame of the toilet assembly.
Figure 18:
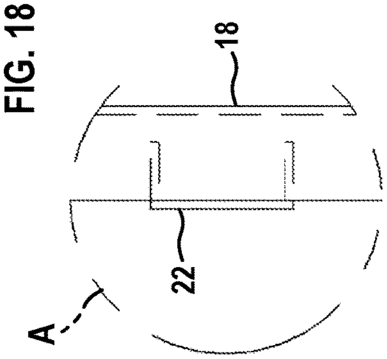
FIG. 18 is an enlarged view of detail A of FIG. 17.
Figure 17:
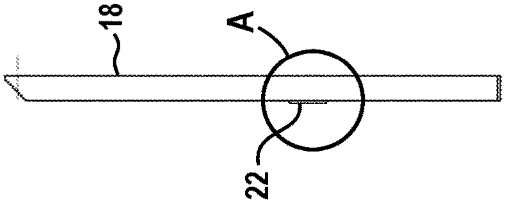
FIGS. 15, 16, and 17 are front, top, and side views of the frame.
Figure 16:
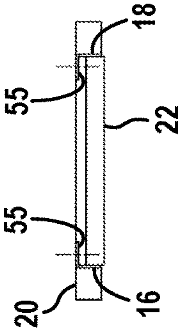
Figure 15:
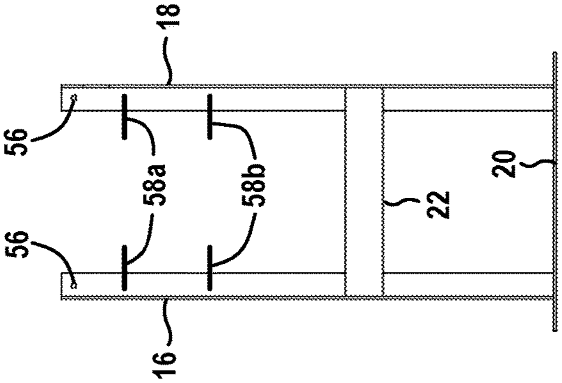

FIG. 14 is an exploded view of the frame 12. FIGS. 15, 16, and 17 are front, top, and side views of the assembled frame 12. FIG. 18 is an enlarged view of detail A of FIG. 17.

Figure 19:
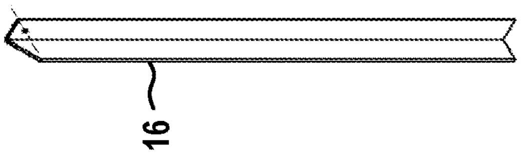
FIG. 19 is a perspective view of a first upright member of the frame.
Figure 22:
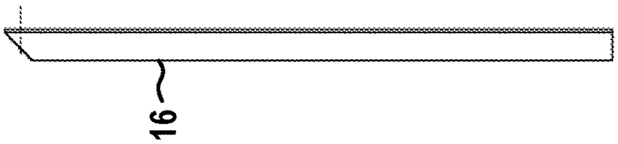
FIGS. 20, 21, and 22 are front, top, and side views respectively of a second upright member of the frame.
Figure 20:
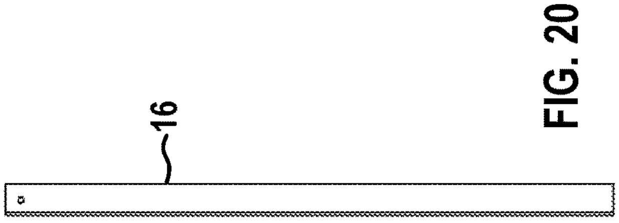
Figure 21:

FIG. 19 is a perspective view of upright member 16. FIGS. 20, 21, and 22 are front, top, and side views respectively of the upright member 18.

Figure 23:
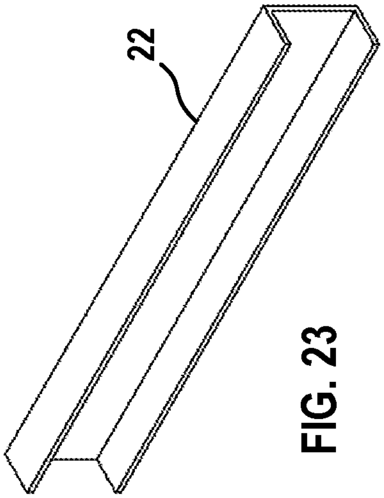
FIG. 23 is a perspective view of a cross-member of the frame.
Figure 24:
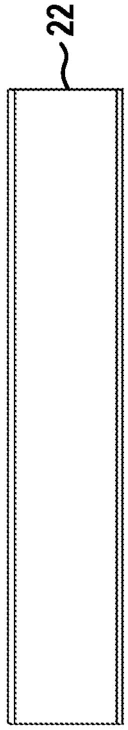
FIGS. 24 and 25 are respectively front and end views of the cross-member.
Figure 25:
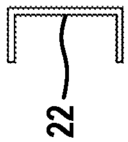

FIG. 23 is a perspective view of the cross-member 22. FIGS. 24 and 25 are respectively front and end views of the cross-member.

Figure 26:
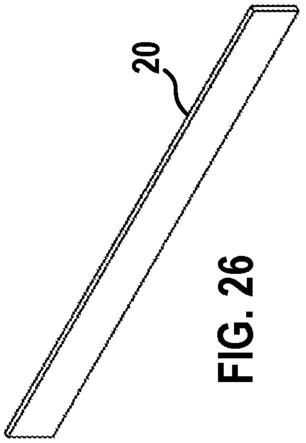
FIG. 26 is a perspective view of the foot plate 20 of the frame.
Figure 28:
FIGS. 27 and 28 are respectively top and side views of the foot plate.
Figure 27:
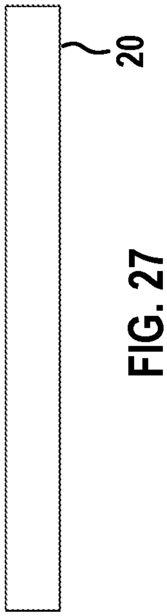

FIG. 26 is a perspective view of the foot plate 20. FIGS. 27 and 28 are respectively top and side views of the foot plate.

The upright members 16, 18 are similar "L"-shaped elongate members. As shown in FIG. 15, the lower ends of the upright members 16, 18 are welded to the foot plate 20. One leg of each upright member is positioned to extend along an end of the foot plate and the other leg of each upright are co-planar and extend along the same side of the foot plate.

The cross-member 22 is a "U" shaped elongate member. As shown in FIGS. 15, 16, and 18 the ends of the cross-member are welded to the facing legs of the upright members 16, 18. As seen in FIGS. 16 and 18, the cross-member 22 is spaced away from the co-planar legs of the upright members to define a gap 55 between the cross-member and those legs of the upright members.

Figure 29:
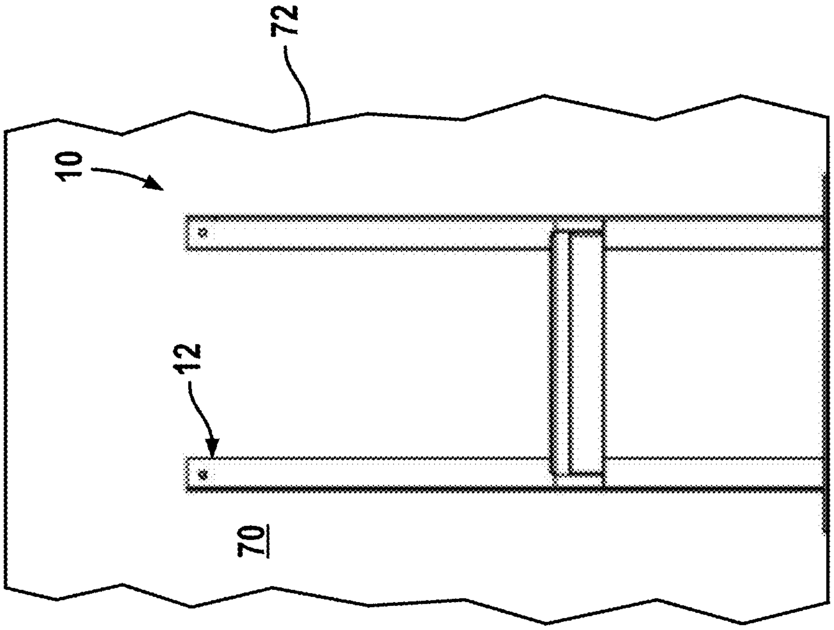
FIG. 29 illustrates the frame of the toilet seat assembly attached to an interior wall 70 of a recreational vehicle or travel trailer.

The upright members 16, 18 each include screw holes (for example back screw holes 56 and side screw holes indicated by sets of screws 58*a*, 58*b* as shown in FIG. 15) for fixedly mounting the frame 12 to a wall or between vertical wall studs of the trailer or vehicle. FIG. 29 illustrates the frame 12 of the toilet seat assembly 10 fixedly attached to an interior wall 70 of a recreational vehicle or travel trailer 72.

To attach and mount the toilet seat support 14 (which can be carrying the toilet seat) to the frame 12, the gap 54 of the toilet seat support is placed over and aligned with the cross-member 22. The toilet seat support is lowered to receive the cross-member 22 through the gap 54 and into the slot 53 between the frame upright members 16, 18. The side panel sides 32 engage against the cross-member 22 and in cooperation with the back panel 52 resist downward pivotal displacement of the mounted toilet seat support 14 from the force of gravity or by the weight of a user during use.

When the toilet seat support 14 is attached to the frame cross-member 22, the toilet seat support is supported as a cantilever beam/end portion-supported beam on the frame 12. The side panels 32 resist bending of the upper flat portion of the toilet seat support 14 formed from the semi-circular portion 30 and the rectangular portion 31.

A waste-receiving receptacle (not shown) extends from or is placed beneath the waste-receiving hole 44 during use of the toilet 10.

To remove the mounted toilet seat support 14 from the frame 12, the toilet seat support is lifted vertically to move the cross-member 22 out of the toilet seat support slot 53 and space the toilet seat support away from the cross-member.

Although this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art including (but not limited to) changes in material selection, size, height of the toilet seat assembly when attached to the frame, and the like.

What is claimed is:

1. A toilet seat assembly comprising:

a frame and a toilet seat support removably mountable on the frame;

the frame comprising a pair of spaced apart elongate vertical uprights, each vertical upright being a member extending in a vertical direction along a vertical axis of the vertical upright between opposite upper and lower ends of the vertical upright, and a cross-member attached to and extending between the pair of vertical uprights, the cross-member spaced from the lower ends of the vertical uprights, the cross-member extending along a horizontal axis;

the toilet seat support being configured to support a toilet seat on an upper surface thereof, the toilet seat support comprising a hole extending from the upper surface to an opposite lower surface of the toilet seat support for receiving waste, the toilet seat support extending between front and back sides of the toilet seat support, the toilet seat support defining a slot extending along the back side of the toilet seat support, the slot being sized to closely receive the cross-member into the slot; and the toilet seat support being in an operating position with respect to the frame to define a toilet when the cross-member is in the slot, the toilet seat support when in the operating position extending horizontally away from the frame cross-member from the slot to the front side of the toilet seat support with the through-opening being paced away from the frame, the toilet seat support engaging the cross-member wherein the cross-member resists pivotal movement of the toilet seat support.

2. The toilet seat assembly of claim 1 wherein the toilet seat support comprises a back panel extending along the back side of the toilet seat support, the back panel extending transverse to the upper surface of the toilet seat support, the back panel facing and bounding a side of the slot.

3. The toilet seat assembly of claim 1 wherein the slot extends along an axis, the toilet seat support extends in a width direction parallel with the slot axis between opposite sides of the toilet seat support;

the toilet seat support comprises a pair of side panels disposed on respective sides of the toilet seat support; and each side panel comprises an end spaced from and facing the back panel, the ends of the side panels disposed along the slot.

4. The toilet seat assembly of claim 3 wherein when the toilet seat support is in the operating position, the ends of the side panels engage the cross-member to resist pivotal movement of the toilet seat support caused by the weight of the toilet seat support or by the weight of a user sitting on the toilet seat support.

5. The toilet seat assembly of claim 3 wherein a portion of the toilet seat support that includes the hole, the back panel, and the side panels is a one-piece homogeneous member.

6. The toilet seat assembly of claim 1 wherein the frame comprises a foot plate spaced from the cross-member, the pair of vertical uprights extending from the foot plate and past the cross-member.

7. The toilet seat assembly of claim 1 wherein the foot plate extends axially between opposite ends of the foot plate, each of the vertical uprights being disposed along the foot plate inwardly from respect ends of the foot plate.

8. The toilet seat assembly of claim 1 wherein the toilet seat support comprises a pair of seat bolt holes on 5½ inch centers.

9. The toilet seat assembly of claim 1 wherein the toilet seat support is configured to support a toilet bowl seat configured for use with an elongate toilet bowl that is 18½ inches from seat posts to front of rim or is configured for use with a round toilet bowl that is 16½ inches from seat posts to front of rim.

10. The toilet seat assembly of claim 1 wherein the frame is fixedly attached to a travel trailer or recreation vehicle.

* * * * *